United States Patent
Cobler et al.

(10) Patent No.: US 12,231,189 B2
(45) Date of Patent: Feb. 18, 2025

(54) DEVICES, SYSTEMS AND METHODS USING A COMMON FRAME OF REFERENCE TO PROVIDE A CONSISTENT MAGNETIC FIELD ORIENTATION FOR MAGNETIC COUPLING

(71) Applicant: Cascodium LLC, Andover, MA (US)

(72) Inventors: Patrick J. Cobler, Nashua, NH (US); Scott A. Rhodes, North Andover, MA (US)

(73) Assignee: Cascodium LLC, Andover, MA (US)

( * ) Notice: Subject to any disclaimer, the term of this patent is extended or adjusted under 35 U.S.C. 154(b) by 624 days.

(21) Appl. No.: 17/314,658

(22) Filed: May 7, 2021

(65) Prior Publication Data
US 2021/0351814 A1 Nov. 11, 2021

Related U.S. Application Data

(60) Provisional application No. 63/028,347, filed on May 21, 2020, provisional application No. 63/021,638, filed on May 7, 2020.

(51) Int. Cl.
*H04B 5/73* (2024.01)
*G01D 5/20* (2006.01)
(Continued)

(52) U.S. Cl.
CPC ............... *H04B 5/73* (2024.01); *G01D 5/20* (2013.01); *G01V 3/10* (2013.01); *H04B 5/24* (2024.01); *H04B 5/48* (2024.01); *H04W 76/10* (2018.02)

(58) Field of Classification Search
CPC ...... H04B 5/0006; H04B 5/06; H04B 5/0043; H04B 5/0075; H04B 5/0081;
(Continued)

(56) References Cited

U.S. PATENT DOCUMENTS

| 3,868,565 A | 2/1975 | Kuipers |
| 3,983,474 A | 9/1976 | Kuipers |

(Continued)

FOREIGN PATENT DOCUMENTS

| EP | 2040086 B1 | 8/2018 |
| JP | 2013072643 A | * 4/2013 |

(Continued)

OTHER PUBLICATIONS

International Search Report and Written Opinion from related PCT application PCT/US2021/031345, mailed Aug. 13, 2021. 14 pages.

(Continued)

*Primary Examiner* — David M Schindler
(74) *Attorney, Agent, or Firm* — Grossman, Tucker, Perreault & Pfleger, PLLC

(57) ABSTRACT

Devices, systems and methods for magnetic field coupling, as described herein, optimize magnetic coupling between transducers generating and detecting quasistatic magnetic fields by translating the generated and detected magnetic fields into a common frame of reference, such as the Earth's gravitational field. In general, a receiving device has knowledge of the strength and direction of a quasistatic magnetic field generated by a transmitting device, which allows the generated magnetic field to be measured and interpreted by the receiving device in the context of the common frame of reference. Such devices, systems, and methods may use magnetic coupling, for example, for proximity detection and/or for communication between devices. Magnetic coupling may be used for proximity detection, for example, by detecting a magnetic field having a defined magnetic field range and/or by measuring magnetic field strength and/or direction and determining distance and/or location.

26 Claims, 6 Drawing Sheets

(51) Int. Cl.
*G01V 3/10* (2006.01)
*H04B 5/24* (2024.01)
*H04B 5/48* (2024.01)
*H04W 76/10* (2018.01)

(58) Field of Classification Search
CPC ...... H04B 5/0087; H04B 5/0093; H04B 5/02; H04B 7/084; H04B 1/385; H04B 5/73; H04B 5/24; H04B 5/48; H04B 5/77; H04W 76/10; H04W 4/023; G01V 3/10; G01V 3/081; G01R 33/0005; G01R 33/028; G01R 33/0283; G01B 7/003; G01B 7/004; G01B 7/008; H04M 1/6066; H02J 50/10; H02J 7/00034; G01D 5/20
See application file for complete search history.

(56) References Cited

U.S. PATENT DOCUMENTS

| | | | |
|---|---|---|---|
| 4,054,881 | A | 10/1977 | Raab |
| 4,613,866 | A * | 9/1986 | Blood ............... G05B 19/4207 324/207.13 |
| 5,912,925 | A | 6/1999 | Palermo et al. |
| 5,982,764 | A | 11/1999 | Palermo et al. |
| 7,035,608 | B2 | 4/2006 | Palermo et al. |
| 7,142,811 | B2 | 11/2006 | Terranova et al. |
| 7,215,924 | B2 | 5/2007 | Palermo et al. |
| 7,236,741 | B2 | 6/2007 | Palermo et al. |
| 7,532,901 | B1 | 5/2009 | Lafranchise et al. |
| 7,574,173 | B2 | 8/2009 | Terranova et al. |
| 8,049,614 | B2 | 11/2011 | Kahn et al. |
| 8,159,399 | B2 | 4/2012 | Dorsey et al. |
| 8,410,775 | B2 | 4/2013 | Lafranchise et al. |
| 8,446,275 | B2 | 5/2013 | Utter, II |
| 8,527,688 | B2 | 9/2013 | Chatterjee et al. |
| 8,867,993 | B1 | 10/2014 | Perkins et al. |
| 8,880,100 | B2 | 11/2014 | Dobyns |
| 8,929,809 | B2 | 1/2015 | Dobyns |
| 9,397,726 | B2 | 7/2016 | Dobyns |
| 9,400,985 | B2 | 7/2016 | Dobyns |
| 9,455,771 | B2 | 9/2016 | Dobyns |
| 9,560,505 | B2 | 1/2017 | Dobyns |
| 9,621,227 | B2 | 4/2017 | Dobyns et al. |
| 9,621,228 | B2 | 4/2017 | Dobyns et al. |
| 9,705,564 | B2 | 7/2017 | Dobyns et al. |
| 9,722,674 | B2 | 8/2017 | Dobyns |
| 9,740,823 | B2 | 8/2017 | Breazeale, Jr. |
| 9,780,837 | B2 | 10/2017 | Dobyns et al. |
| 9,838,082 | B2 | 12/2017 | Dobyns et al. |
| 9,875,635 | B2 | 1/2018 | Sawada |
| 9,882,413 | B2 | 1/2018 | Jeong |
| 9,929,569 | B2 * | 3/2018 | Tillotson ................. G01B 7/30 |
| 9,960,813 | B2 | 5/2018 | Dobyns |
| 10,038,475 | B2 | 7/2018 | Dobyns et al. |
| 10,084,512 | B2 | 9/2018 | Dobyns et al. |
| 10,103,786 | B2 | 10/2018 | Dobyns |
| 10,117,050 | B2 | 10/2018 | Dobyns |
| 10,122,414 | B2 | 11/2018 | Dobyns et al. |
| 10,164,685 | B2 | 12/2018 | Dobyns et al. |
| 10,164,688 | B2 | 12/2018 | Rothkopf |
| 10,251,610 | B2 | 4/2019 | Parthasarathy et al. |
| 11,029,369 | B1 * | 6/2021 | Higgins ............. G01R 33/0017 |
| 2002/0062203 | A1 | 5/2002 | Gilboa |
| 2006/0036619 | A1 | 2/2006 | Fuerst et al. |
| 2008/0174500 | A1 | 7/2008 | Turner |
| 2010/0115349 | A1 | 5/2010 | Ho et al. |
| 2010/0117838 | A1 | 5/2010 | Humbard |
| 2011/0025464 | A1 | 2/2011 | Geng et al. |
| 2011/0210621 | A1 * | 9/2011 | Iwaisako ................ A61B 1/041 307/104 |
| 2011/0251815 | A1 | 10/2011 | Bar-Tal |
| 2019/0141476 | A1 | 5/2019 | Dobyns |
| 2019/0288542 | A1 | 9/2019 | Konanur |
| 2019/0356178 | A1 | 11/2019 | Widmer et al. |
| 2019/0356358 | A1 | 11/2019 | Dobyns et al. |
| 2019/0373411 | A1 | 12/2019 | Dobyns |
| 2019/0386707 | A1 | 12/2019 | Dobyns |
| 2020/0006851 | A1 * | 1/2020 | Kerselaers .......... H04B 5/0075 |
| 2020/0021333 | A1 | 1/2020 | Dobyns et al. |
| 2020/0044696 | A1 | 2/2020 | Dobyns |
| 2020/0067569 | A1 | 2/2020 | Dobyns et al. |
| 2020/0076473 | A1 | 3/2020 | Dobyns et al. |
| 2020/0083929 | A1 | 3/2020 | Dobyns et al. |
| 2020/0083930 | A1 | 3/2020 | Dobyns et al. |
| 2020/0092674 | A1 | 3/2020 | Dobyns |
| 2020/0112342 | A1 | 4/2020 | Dobyns et al. |

FOREIGN PATENT DOCUMENTS

| | | | |
|---|---|---|---|
| WO | 199637052 | A1 | 11/1996 |
| WO | 2011112795 | A1 | 9/2011 |
| WO | WO-2018191428 | A1 * | 10/2018 ............. G01B 7/003 |

OTHER PUBLICATIONS

Foy, K. "Bluetooth Signals from Your Smartphone Could Automate Covid-19 Contact Tracing while Preserving Privacy". MIT News, Apr. 8, 2020, pp. 1-4.

Raab, et al., "Magnetic Position and Orientation Tracking System", IEEE Transactions on Aerospace and Electrocic Systems, vol. AES-5, No. 5, Sep. 1979, pp. 709-718.

* cited by examiner

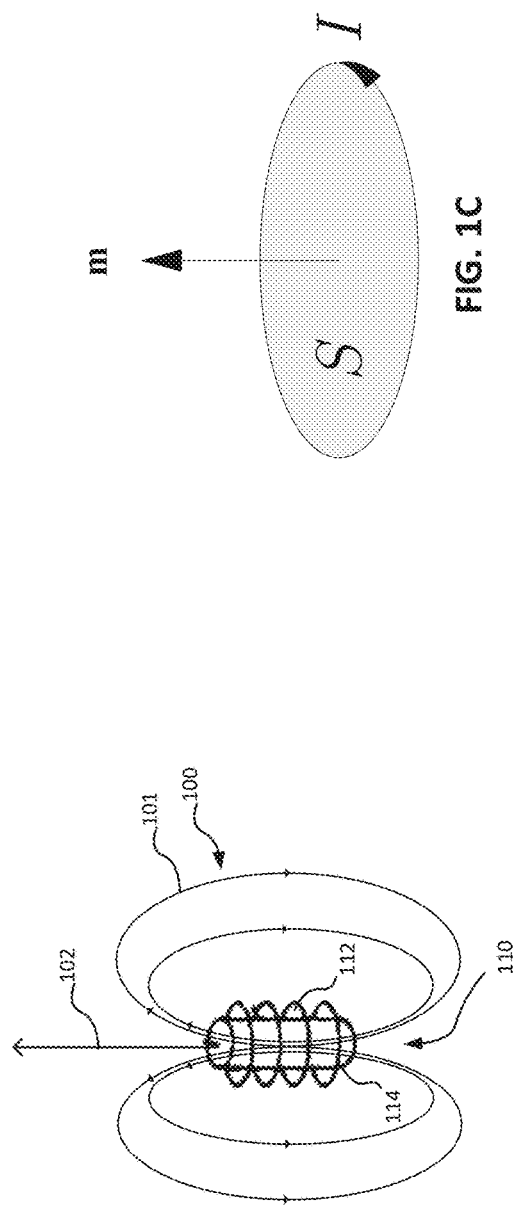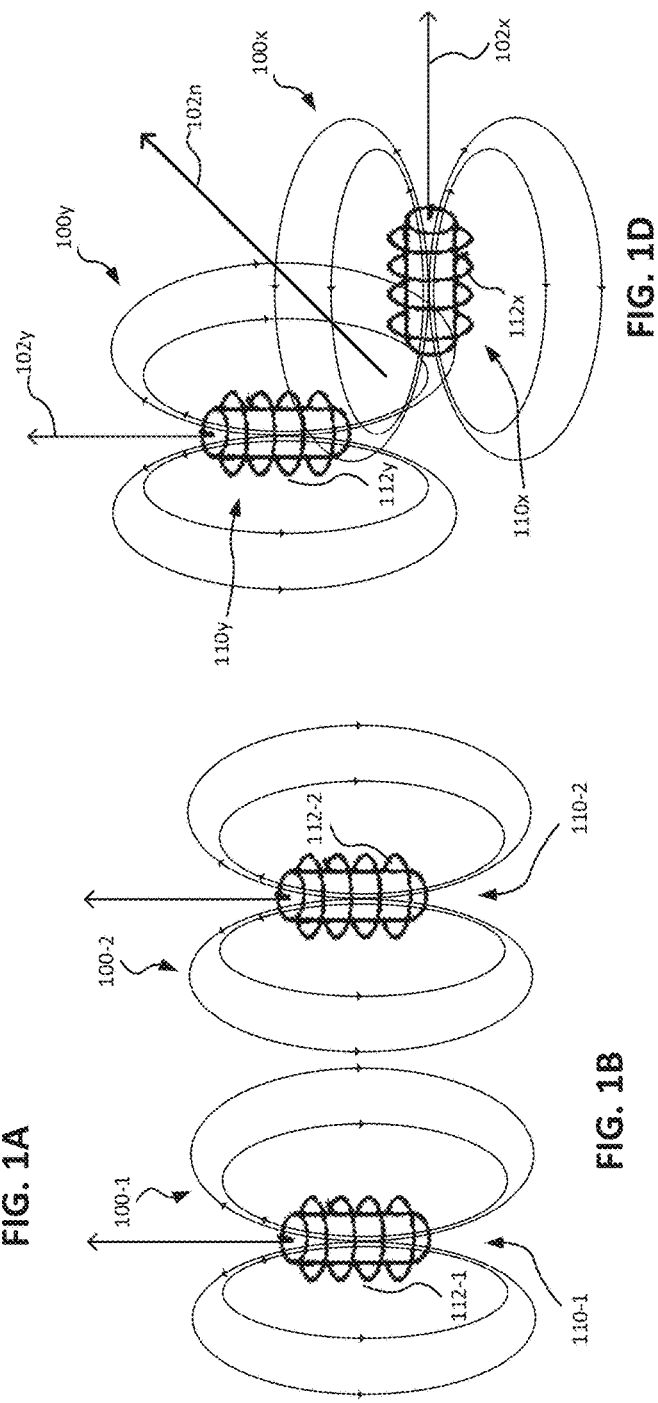

DEVICES, SYSTEMS AND METHODS USING A COMMON FRAME OF REFERENCE TO PROVIDE A CONSISTENT MAGNETIC FIELD ORIENTATION FOR MAGNETIC COUPLING

RELATED APPLICATION

The present application claims the benefit of U.S. Provisional Application Ser. No. 63/021,638 filed May 7, 2020 and U.S. Provisional Application Ser. No. 63/028,347 filed May 21, 2020, both of which are fully incorporated herein by reference.

TECHNICAL FIELD

The present disclosure relates to magnetic field coupling and more particularly, to magnetic field coupling using a common frame of reference to provide a consistent magnetic field orientation for magnetic coupling.

BACKGROUND INFORMATION

Currently, in addition to known long-range radio and optical communication systems that utilize propagating electromagnetic fields, there are wireless communication systems using quasistatic magnetic fields. These magnetic communication systems include specialized short-range audio systems as described, for example in U.S. Pat. Nos. 5,982,764; 7,254,366; and 5,912,925, which are incorporated herein by reference. Such systems use magnetic field transducers (e.g., a wire coil) to generate and detect the magnetic fields for transmitting and receiving functions. Longer range systems using non-radiating magnetic fields also are known and described, for example, in U.S. Pat. No. 4,054,881. Although the use of quasistatic magnetic fields that are non-radiating provides advantages for certain applications, there are some unique challenges with the orientation and alignment of the transducers to provide effective magnetic field coupling.

SUMMARY

According to one aspect of the present disclosure, a device includes a plurality of transducers configured to generate quasistatic magnetic fields to establish a magnetic coupling with at least one transducer of another device when located within a magnetic field range. The transducers are configured to generate the magnetic fields, respectively, having different magnetic dipole moments with vector components in at least two axes, wherein superposition of the magnetic fields forms a net magnetic moment. The device also includes a sensor configured to establish a common frame of reference and circuitry configured to drive the transducers to control at least magnitudes of each of the magnetic fields such that the net magnetic moment aligns substantially with the common frame of reference.

According to another aspect of the present disclosure, a method includes: sensing a direction relative to at least a transmitting device to establish a common frame of reference for the transmitting device; generating at least one quasistatic magnetic field in the transmitting device relative to the common frame of reference; sensing a direction relative to at least a receiving device to establish the common frame of reference for the receiving device; detecting the at least one quasistatic magnetic field in the receiving device to establish a magnetic coupling between the transmitting and receiving devices in the context of the common frame of reference.

According to a further aspect of the present disclosure, a system includes a plurality of magnetic transceiver devices configured to perform a proximity magnetic coupling when located within a magnetic field range. Each of the magnetic transceiver devices includes a plurality of transducers configured to generate and detect a plurality of quasistatic magnetic fields to establish the magnetic coupling when located within the magnetic field range. The transducers are configured to generate the magnetic fields, respectively, having different magnetic dipole moments with vector components in at least two axes, wherein superposition of the magnetic fields forms a net magnetic moment. Each of the transceiver devices also includes a sensor configured to establish a common frame of reference and circuitry configured to control the transducers such that generated and detected magnetic fields are translated into the common frame of reference to facilitate magnetic coupling between the transceiver devices.

BRIEF DESCRIPTION OF THE DRAWINGS

These and other features and advantages will be better understood by reading the following detailed description, taken together with the drawings wherein:

FIG. 1A is a schematic diagram illustrating a single transducer with a solenoid coil generating a magnetic vector field with a pointing direction defined by its magnetic moment.

FIG. 1B is a schematic diagram illustrating transmitting and receiving transducers generating and detecting magnetic vector fields to establish magnetic coupling.

FIG. 1C illustrates a magnetic dipole moment m of a current loop having a magnitude I and enclosing an area S.

FIG. 1D is a schematic diagram illustrating orthogonally-arranged transducers generating magnetic vector fields that are superimposed to produce a net magnetic moment with a net magnitude and direction.

DETAILED DESCRIPTION

Figure 2:
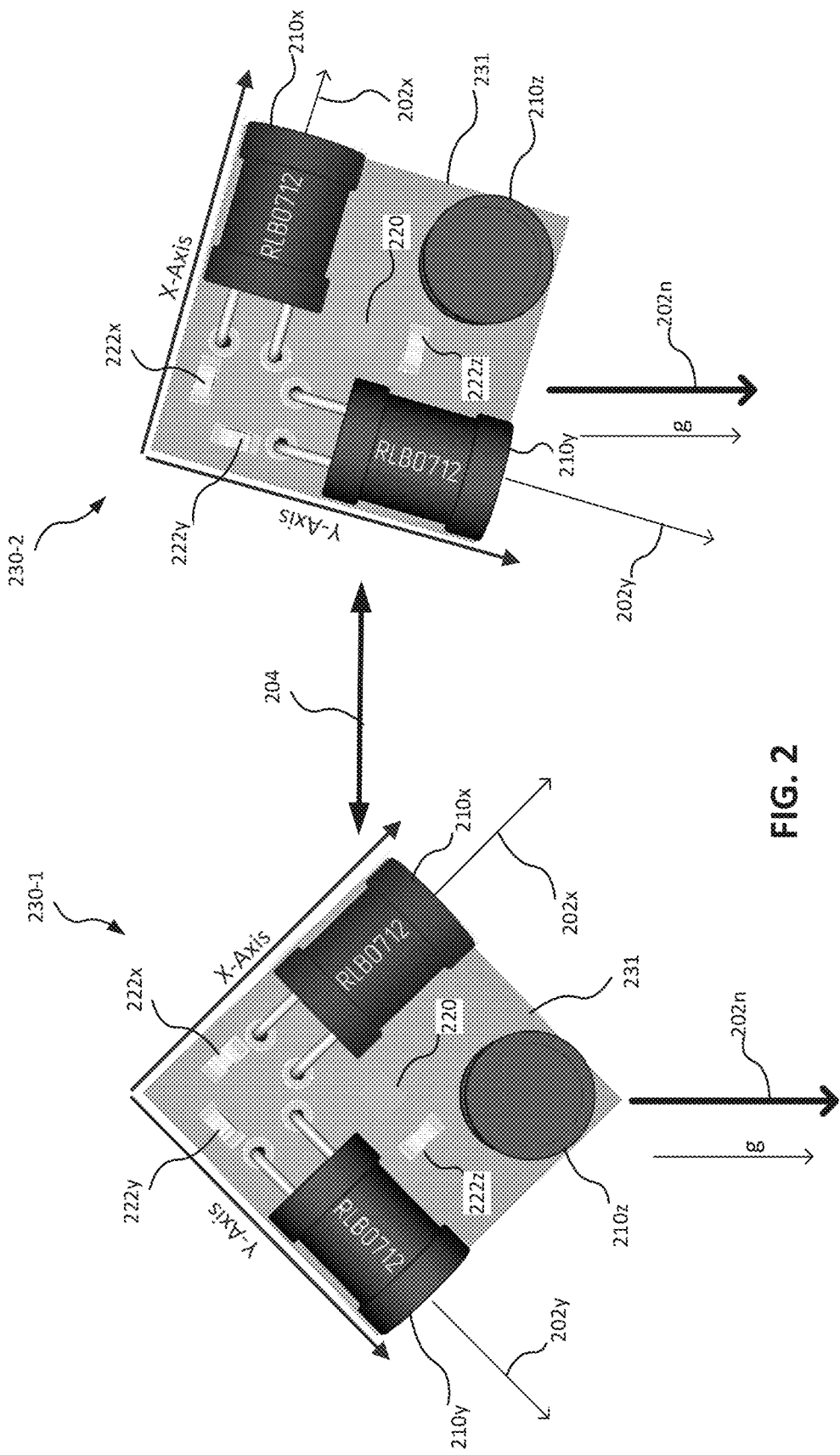
FIG. 2 is a top view of first and second magnetic induction transceivers having different orientations and substantially the same net magnetic moment direction aligned with a direction of gravity, consistent with embodiments of the present disclosure.

Devices, systems and methods for magnetic field coupling, consistent with embodiments described herein, optimize magnetic coupling between transducers generating and detecting quasistatic magnetic fields by translating the generated and detected magnetic fields into a common frame of reference, such as the Earth's gravitational field. In general, a receiving device has knowledge of the strength and direction of a quasistatic magnetic field generated by a transmitting device, which allows the generated magnetic field to be measured and interpreted by the receiving device in the context of the common frame of reference. Such devices, systems, and methods may use magnetic coupling, for example, for proximity detection and/or for communication between devices. Magnetic coupling may be used for proximity detection, for example, by detecting a magnetic field having a defined magnetic field range and/or by measuring magnetic field strength and/or direction and determining distance and/or location. The strength and/or direction of the magnetic field generated by a transmitting device may be known by a receiving device to allow the receiving device to determine the detection range from the detected magnetic field.

As used herein, "transducer" refers to a device or component that converts electrical energy into a quasistatic magnetic field. One example of a "transducer" includes coils, although this is not a limitation of the present disclosure. As used herein, a "transceiver" refers to a device that performs both a transmitting and receiving function using one or more transducers to generate and detect quasistatic magnetic fields. As used herein, "magnetic coupling" refers to one or more transducers in at least one device detecting quasistatic magnetic fields generated by one or more transducers in at least another device. The term "magnetic coupling" does not necessarily require both devices to detect magnetic fields generated by the other device.

As used herein, "defined magnetic field range" is a range of quasistatic magnetic fields that are capable of being used for magnetic field coupling and that falls off rapidly with distance. As used herein, "proximity magnetic field detection" refers to detection of a magnetic field having a defined magnetic field range and "proximity magnetic field communication" refers to a discrete communication of information between devices using quasistatic magnetic fields having a defined magnetic field range. As used herein in the context of a magnetic moment, "align" refers to the magnetic moment vector being substantially parallel to a vector in the common reference frame and does not necessarily require the magnetic moment vector to point in the same direction as the vector in the common reference frame. For example, a magnetic moment that is aligned with a sensed direction of gravity means that the magnetic moment vector is substantially parallel to a gravity vector.

In some embodiments, magnetic communication devices establish a proximity magnetic communication (i.e., with another magnetic communication device) when located within a defined magnetic field communication range. In some embodiments, each magnetic communication device includes a gravity sensor and a magnetic induction transceiver configured to transmit and receive by generating and detecting quasistatic magnetic fields with a net magnetic moment substantially aligned with the sensed direction of gravity. In other embodiments, a transmitting device may transmit orientation information indicating orientation of the transmitting device relative to the common frame of reference (e.g., a sensed direction of gravity) without aligning the generated magnetic field, and the receiving device may use the orientation information to measure and interpret the detected magnetic field from the transmitting device in the context of the common frame of reference. One example application for the magnetic communication devices is proximity detection in a contact tracing system, for example, to mitigate transmission of infectious disease. In other embodiments, magnetic coupling devices may be used to provide proximity detection without using the magnetic field to provide a discrete communication of information.

An embodiment of a magnetic induction transceiver may control transducers generating quasistatic magnetic fields substantially orthogonally such that superposition of the magnetic fields forms a net dipole vector magnetic field from a net magnetic moment that may be aligned relative to the common reference frame, as will be described in greater detail below. Transmit circuitry may be configured to drive the transducers to control magnitudes and phases of each of the generated orthogonal magnetic fields such that the net magnetic moment of the net dipole vector magnetic field aligns with a fixed direction determined in the common reference frame. Receive circuitry may be configured to receive current and/or voltage generated from the transducers that detect the net vector magnetic field and to translate the detected/received signals into the common reference frame of the generator transducers. Although the magnetic fields may be generated by orthogonally-arranged transducers, physically orthogonal transducers for generating and detecting vector fields is not required as long as each set of transducers has significant vector components in each of the orthogonal directions (e.g., along X, Y, and Z axes).

Referring to FIGS. 1A-1D, the directionality of magnetic moments and their resulting magnetic fields and the concept of superposition of magnetic vector fields to form a net dipole magnetic vector field with a net magnetic moment is described in greater detail. One way to generate a magnetic field 100 for magnetic coupling is to cause an electrical current to flow in a circular loop, for example, in a wire coil 112. The illustrated example shows a solenoidal coil 112 of wire wrapped around a cylindrically shaped rod 112 of material with elevated magnetic permeability, similar to certain inductors used in modern electronics. The coil 112 around the magnetically permeable rod 114 forms one example of a transducer 110 that may be used in a magnetic induction transceiver, consistent with embodiments of the present disclosure.

As shown in FIG. 1B, transducers 110-1, 110-2 with similar inductors or coils 112-1, 112-2 can be used to detect or receive the magnetic fields 110-1, 110-2 generated by the other transducer. The field lines linking the generator and detector transducers 110-1, 110-2 can also be modeled as a loosely coupled magnetic transformer (i.e., a transformer with a large leakage component).

Because the magnitude of the resulting field 100 follows a well-known dipole mathematical relationship, the measurement of the magnitude or intensity of the received field (e.g., field 100-1 or 100-2) is an indicator of the distance between the generator transducer and the detector transducer (e.g., between transducers 110-1, 110-2). In such fields generated from a magnetic moment, the magnitude of the field strength, H, has a relationship with distance from its source that is proportional to $1/d^3$ (i.e., magnetic field strength falls off proportional to the cubed distance from the source dipole). The dipole approximation is most accurate when the proximal distance between transducers (e.g., transducers 110-1, 110-2) is relatively large compared to the physical dimensions of the current loop (i.e., solenoid loop or coil 112). In the illustrated example, the dimensions of the inductor may be less than 1 inch. Thus, at distances greater than a few inches, the field lines generated by current flow through the inductor is well approximated by a dipole field pattern from a properly scaled current loop.

One skilled in the art can implement other practical implementations of dipole-approximating current loops. In other examples, dipole approximating current loops can also be physically and practically realized with planar coils of wire, spiral coils, and/or PCB (printed circuit board) trace.

The quasistatic magnetic fields are intentionally non-radiating in these systems, which provides an advantage, for example, in contrast to traditional RF, wireless systems using antennas that are specifically designed to radiate electromagnetic energy or waves over long distances. The locality of quasistatic magnetic fields increases their security from remote eavesdropping since the goal is to limit the range to a small "bubble" around the transducer generating the transmit magnetic field. The limited range field characteristic can also be utilized for the determination of proximal relationships between devices. The ability to detect range is further enhanced by the lack of wave-like interactions exhibited in traditional electromagnetic radiating system.

The three-dimensional dipole field 100 generated from a current loop (e.g., coil 112) is a vector field with both magnitude and direction in a given coordinate system, such as a Cartesian coordinate system (X, Y, or Z) or any other three-dimensional coordinate system such as cylindrical or spherical. As shown in FIG. 1C, a current loop can also be represented by a single vector quantity having a magnitude and direction, commonly referred to as the magnetic moment of the current loop. The magnetic moment m of a single current loop having a surface area S (i.e., $\pi r^2$) and current I is equal to the product of the surface area S and current I (m=SI). The magnetic moment defines both field strength and field direction relative to the orientation, size, and magnitude of the current loop. The direction of the magnetic moment can be described as "pointing" normal to the surface made by the current loop with its polarity set by the "right-hand rule" based on the positive current flow in the loop. Multiple current loops each with their own magnetic moment can be vector summed to form a net, magnetic moment with a corresponding net, vector magnetic field. In the illustrated example of the transducer 110, the magnetic moment 102 is formed by the vector sum of the magnetic moments of the individual turns of the coil 112.

A problem in such magnetic communications or coupling systems is the formation of "nulls" between randomly positioned transmit and receive transducers. Because of the directionality of the magnetic field 100, using a single inductor or coil 112 to generate the magnetic field 100 may result in "nulls" when the receiving inductor or coil is positioned so that the net magnetic flux linking the coils is zero. In other words, the degree of coupling of the magnetic fields (magnetic flux linkage) for magnetic coupling between the single transducers 110-1, 110-2 is dependent upon their relative orientation and alignment. This phenomenon limits the ability to determine proximal distance between a transmit/generate transducer and a receive/detect transducer by measuring the strength of the coupled field, especially in physical configurations where the transducers have random, physical orientations relative to one another.

Techniques to overcome these null configurations and to optimize the flux linkage in these systems present some challenges. As shown in FIG. 1D, to facilitate alignment for magnetic coupling, multiple transducers 110x, 110y may be arranged orthogonally within a single magnetic induction transceiver to provide orthogonally-arranged magnetic fields 100x, 100y with orthogonally-arranged magnetic moments 102x, 102y. Three transducers may be arranged orthogonally along three axes (X, Y, Z), although FIG. 1D shows two transducers 110x, 110y along two axes (X, Y) for simplicity. Superposition of multiple dipole fields 100x, 100y, located substantially at the same origin in a coordinate system, can be represented as a single dipole field with a single magnetic moment (i.e., net magnetic moment 102n) having a different intensity and pointing in a different direction than any of its constituent dipole fields 100x, 100y and corresponding magnetic moments 102x, 102y.

Regardless of the physical orientation of a plurality of individual coils 112x, 112y within a given coordinate system, it is possible to superimpose the dipole vector fields 100x, 100y of each individual, physical coil 112x, 112y together into one, net "virtual" field pattern. If the individual coils 112x, 110y are all located substantially at the origin in a coordinate system (i.e., on top of one another), the resulting net vector field pattern can approximate that of a single wire loop with a single magnetic moment (i.e., the net magnetic moment 102n) that is pointed virtually, not physically, with some other magnitude or intensity and direction. Using three orthogonal transducers, for example, with a coil on each of the X, Y, and Z axis at (or near) the origin, it is possible to orient a single, superimposed approximate dipole field pattern generated by a net magnetic moment 102n, which points in any direction. The direction of the net magnetic moment 102n may be determined, for example, by determining the appropriate electrical drive of each individual transducer, as will be described in greater detail below. The response of the detector transducer can be similarly interpreted in any frame of reference by choosing the appropriate combination of electrical signals detected on each of three X, Y, and Z detection transducers, as will be described in greater detail below.

Thus, using transducers along X, Y, and Z axes is advantageous in systems where there is an unconstrained physical relationship between generator transducers and detector transducers, such as can occur with wearable or carried devices, because there is always some flux linkage between some set of transducers. Ideally, the relative physical alignment of the generator transducers to the alignment of the detector transducers would be known, and the ideal combination of individual transducer signals could be computed or determined based on this known relative alignment. Since, in an unconstrained physical system, the alignment between sets of transducers is not known, these systems often attempt to extract an optimal detected transducer signal combination solution from the detected signals themselves; however, the detected transducer signals can be weak or interfered with (either by their own electric field components or by externally generated signals—magnetic and/or electric). Thus, using detected transducer signals to estimate relative alignment (i.e., which coils to use for transmit, receive or both) can produce significant errors both in communication and proximal location estimation. This problem is further complicated when the relative positions of the transmit/generator transducers and receive/detector transducers are regularly changing, so that the system has to mitigate this null problem dynamically.

The orientation and alignment problem presents additional challenges in magnetic field coupling systems that are purposely trying to control and/or limit range of interaction, for example, in a proximity sensing application such as contact tracing for mitigating transmission of an infectious disease. Estimates of a range from field strength measurements are less accurate when the null mitigation (an imperfect and complex process) is in error. Errors can occur from the use of weak signals (especially at range limits) or from interfered signals. In magnetic field coupling systems, the voltage signals corresponding to the magnetic signal generator can produce corresponding electric fields that combine and interfere with the received magnetic signals and confuse the null mitigation approach. This can occur in a variety of orientations and conditions, but the electric field interference is enhanced when there is a large conductive surface between transducers (like a metal table or an overhead pipe/duct). When combining this effect with movement between the transducers, proximity estimating errors can be compounded.

If the actual, physical orientations of the generator transducers and the detector transducers are known (i.e., the direction in which they are physically "pointed"), then the net magnetic moment direction of the transducers could be mathematically translated so as to yield an optimal combination of individual detected transducer signals to be determined based on the known physical orientation of the transducers. Thus, the null problem in magnetic field coupling systems may be overcome by using a coordinate reference that is common to both the generator transducers and the detector transducers in magnetic induction transceivers. This may be achieved even in systems that utilize fewer than three individually oriented transducers. For terrestrially located transducers, the direction of the Earth's gravitational field (referred to as the direction of gravity) can be sensed and accurately determined using low-cost, small electrical components (e.g., an accelerometer) to provide that common coordinate reference. Non-terrestrial (orbiting) systems could also utilize the Earth's gravitational field to establish a common frame of reference. Likewise, a system of transducers operating on the surface or in orbit around any moon or other planet could utilize the local gravitational field of the corresponding object for a common frame of reference.

In embodiments of the present disclosure, a gravity sensor may be physically coupled, with a known relative alignment, to the transducers and used to determine the physical orientation of the transducers relative to a common sensed direction of gravity. By co-locating the gravity sensor with a set of transducers, the transducers can be driven in a manner that aligns their generated net magnetic moment direction with the direction of the Earth's gravitational field (i.e., the directions are substantially parallel). In this way, regardless of the physical positioning of the transducers, the net magnetic dipole moment generated from the transducers can have a consistent orientation in the same common reference frame (i.e., aligned with the Earth's gravitational field vector). Thus, the alignment of the generated magnetic dipole moment field pattern with respect to the gravitational field direction is known by the receiving device. The individual detected transducer signals can then be measured to determine a detected magnetic field vector (i.e., with magnitude and direction) in the frame of reference of the detector transducer(s). Using the gravity vector information coupled to the detector transducers, with known physical alignment to the detector transducers, the measured magnetic field vector can be mathematically translated into a common frame of reference (i.e., aligned with the Earth's gravitational field vector) with the generated dipole field.

Alignment of the net magnetic moment directions relative to a direction of gravity constrains the fields generated and detected in a randomly-oriented set of physical transducers to a common frame of reference. The common frame of reference also eliminates the need to extract an optimal detected transducer signal combination solution from the detected transducer signals themselves. As mentioned above, using the detected signals to estimate relative alignment (e.g., which coils to use and/or in what manner of combination) can produce significant errors both in communication and proximal location estimation. Aligning the separate device frames of reference using other, independent co-located sensors (e.g., gravity sensors) reliably and robustly allows that relative alignment to occur and provides a significant advantage. As such, a plurality of magnetic coupling devices may be aligned to the Earth's gravitational field, which they all detect equally, so that they are all relatively aligned to each other. These devices can all generate/transmit and detect/receive while aligned to a common frame of reference.

Alignment of generated magnetic dipole moments using the sensed direction of gravity is particularly advantageous in systems which are purposely trying to determine or measure distance between generation and detection devices. Knowing alignment of the generated magnetic fields removes a variable in systems that are trying to estimate range or distance from the detected vector field measurements. Alignment of the generated magnetic moments with the Earth's gravitational field is also advantageous when a plurality of devices is being used to magnetically couple with magnetic transducers because the need for an optimal detected transducer signal combination solution from the detected transducer signals is eliminated. The measurement of the earth's gravitational field direction is also not affected by the electrical fields used to generate the corresponding magnetic fields in the transducers.

The Earth's gravitational vector field varies around the globe but is essentially constant in magnitude and direction over ranges for which limited range magnetic coupling devices would operate. Thus, any given local plurality of magnetic coupling devices using this technique would be relatively aligned locally, making magnetic coupling and proximal location estimating more reliable and predictable.

Other common reference frames may be used alternatively or in addition to the Earth's gravitational field. In other embodiments, the Earth's static magnetic field may be sensed (e.g., using a compass as a sensor) and used to provide the common coordinate reference (e.g., the direction of magnetic North). Unlike gravity, however, the Earth's magnetic field may be distorted by magnetically permeable material (such as steel or iron structures) and thus may not be as advantageous. In further embodiments, a man-made common coordinate reference may be used in a facility or area. For example, a large man-made magnetic moment may be generated at a known frequency with a known static location and orientation and used as a reference for all devices operating within that facility to be aligned. Multiple such moments could be interspersed in a facility to provide orientation references at fixed locations, for example, similar to static proximity detection devices described below. Other artificial signaling schemes could be based upon acoustic or optical signals.

Figure 3:
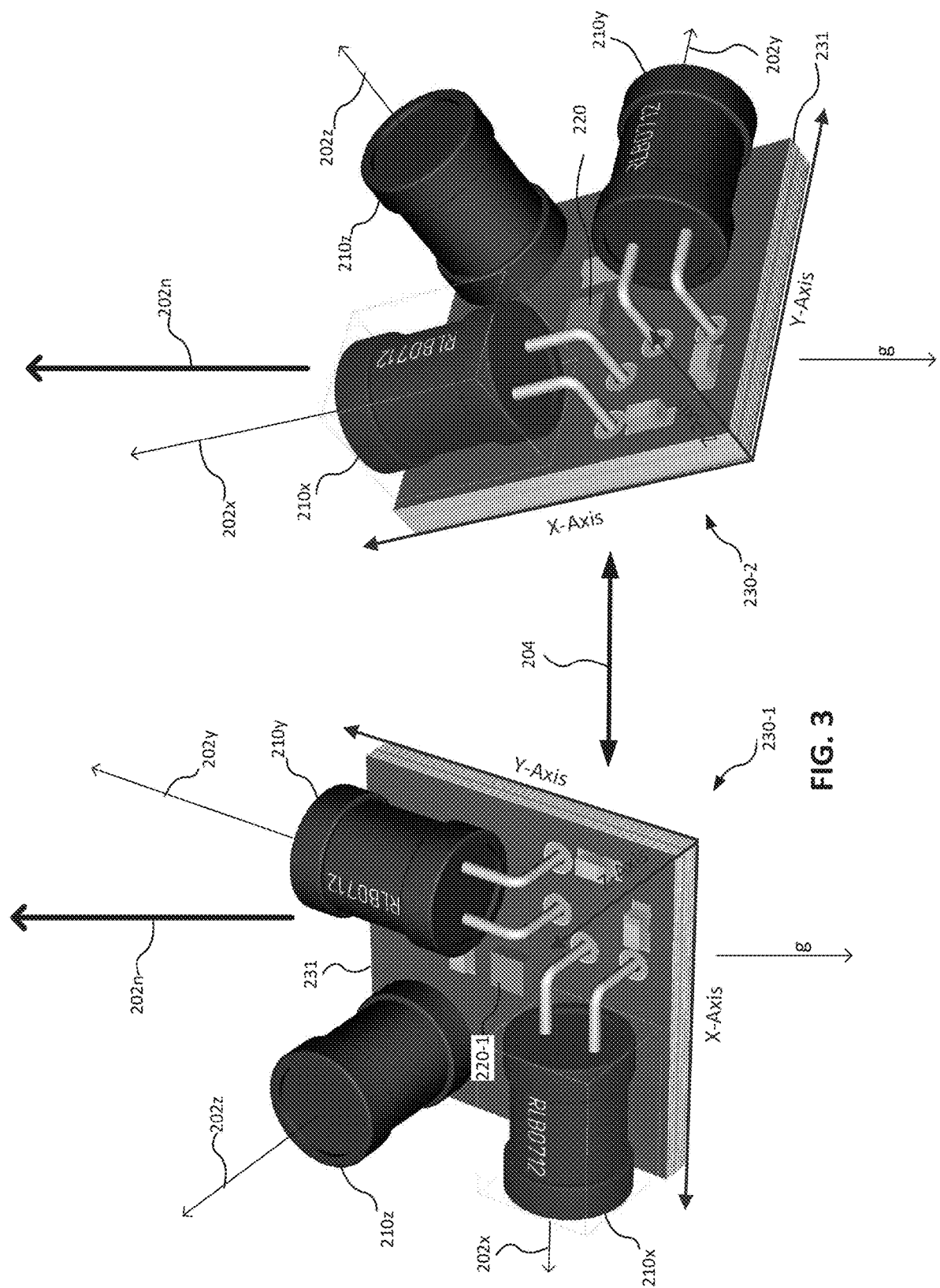
FIG. 3 is a perspective view of first and second magnetic induction transceivers having different orientations and substantially the same net magnetic moment direction aligned with a direction of gravity, consistent with embodiments of the present disclosure.

Referring to FIGS. 2 and 3, an orthogonal arrangement of transducers 210x, y, z with a controllable net magnetic vector field for magnetic coupling is described in greater detail. In the illustrated example, each arrangement of transducers 210x, y, z is located in magnetically-coupled transceivers 230-1, 230-2 having different orientations. These transceivers 230-1, 230-2 may be located, for example, in magnetic coupling devices (not shown) establishing a proximity magnetic detection and/or communication 204. FIG. 2 shows a simple example in two dimensions and FIG. 3 shows an example in three dimensions. Although embodiments are described using transceivers that both transmit and receive, the concepts of the present disclosure may also be implemented in a transmitting device and a receiving device without using transceivers that both transmit and receive.

In this embodiment, each magnetic induction transceiver 230-1, 230-2 includes three orthogonally-arranged transducers 210x, y, z and a gravity sensor 220 mounted on a circuit board 231. In other embodiments, only two orthogonally-arranged transducers may be used or more than three orthogonally-arranged transducers may be used. Each of the transducers 210x, y, z may include a coil of wire (i.e., a solenoid) around a core, for example, as described above. In other embodiments, different types of transducers may be used in an arrangement of transducers 210x, y, z. For example, two of the transducers 210x, y may include solenoid coils coupled to the circuitry board 231 and a third transducer 210z may include a planar coil embedded in the circuit board 231.

The orthogonally-arranged transducers 210x, y, z may be aligned with X, Y, and Z axes in a local cartesian coordinate system for each transceiver. The orthogonally-arranged transducers 210x, y, z are configured to generate quasistatic magnetic vector fields with respective magnetic moments 202x, y, z, as described above, aligned with the local X, Y, and Z axes. The quasistatic magnetic fields with magnetic moments 202x, y, z may be superimposed to form a net magnetic vector field from a net magnetic moment 202n having a magnitude and direction. The net magnetic moment 202n may be controllable to change the magnetic moment direction or orientation by driving each of the transducers 210x, y, z differently. The transducers 210x, y, z do not need to be perfectly orthogonally arranged and may be orthogonal within expected tolerances or may have other arrangements capable of producing separate magnetic fields with magnetic moments 202x, y, z aligned with the X, Y and Z axes.

The arrangement of transducers 210x, y, z generates the quasistatic magnetic fields and the net magnetic vector field to provide a defined net magnetic field, for example, as a function of the size of the wire coil and/or current supplied to the wire coil. The size of the wire coil and/or current supplied to the wire coil may be selected or adjusted to change the generated net magnetic field or resulting magnetic moment. By adjusting the magnetic moment, a magnetic field range may be defined and adjusted for a particular application. The defined magnetic field range may be fixed for a particular transceiver or may be dynamically controlled, for example, by controlling the drive currents. In some applications, the arrangement of transducers 210x, y, z may be capable of a defined magnetic field range of at least 6 feet and possibly up to 12 feet. In other applications, the arrangement of transducers 210x, y, z may be capable of a defined magnetic field range of more than 12 feet, for example, up to 15 feet, up to 20 feet or greater.

The magnetic induction transceivers 230-1, 230-2 may also include other circuitry, such as capacitors 222x, y, z coupled to each of the transducers 210x, y, z, as will be described in greater detail below. The gravity sensor 220 may include, for example, an accelerometer capable of measuring the Earth's gravitational field in both magnitude and direction (vector field). One example of an accelerometer is the type known as LIS2DS12, which is a 2 mm×2 mm 3-axis accelerometer. Other accelerometers or gravity sensors (e.g., tilt sensors) may also be used.

In FIG. 2, the transducers 210x, y are driven in each of the magnetic induction transceivers 230-1, 230-2 such that the respective net magnetic moment 202n is aligned with a direction of gravity (shown as vector g) sensed by the gravity sensors 220. In the transceiver 230-1 where the direction of gravity is about halfway between the local X and Y axes, for example, the transducers 210x, y may be driven to produce X and Y magnetic moments 202x, y having approximately the same magnitude to produce the net magnetic moment 202n about halfway between the local X and Y axes. In the transceiver 230-2 where the direction of gravity is closer to the Y axis, the transducer 210y aligned with the Y axis may be driven to produce a Y magnetic moment 202y having a larger magnitude to produce the net magnetic moment 202n closer to the Y axis and aligned with the direction of gravity.

In FIG. 3, all three transducers 210x, y, z may be driven to produce X, Y, and Z magnetic vector fields and magnetic moments 202z, y, z having different magnitudes resulting in the desired net magnetic moment 202n aligned with the direction of gravity (shown as vector g). As shown in FIG. 3, the net magnetic moment 202n may be aligned with the direction of gravity (i.e., substantially parallel to vector g) but have a vector direction opposite of the direction of gravity. In one embodiment, a plurality of transceivers may align to only one of the two polarities of the direction of the gravitational field. In other embodiments, the transceivers may advantageously switch between positive and negative gravitational alignment in a known and/or synchronous way.

Because of the known alignment, it is possible to extract more information about the proximal relationship between any given set of transducers in the transceivers 230-1, 230-2. The vector direction information becomes reliable and therefore useful. For example, the ability to know reliably the direction of the received signal (in addition to the magnitude or intensity), allows a receiver to more narrowly determine possible locations relative to a generator transducer. This has broad applications for relative proximity measurement, for example, in the application of determining proximal interactions between devices carried by people to support/enhance contact tracing of infectious disease.

Figure 4:
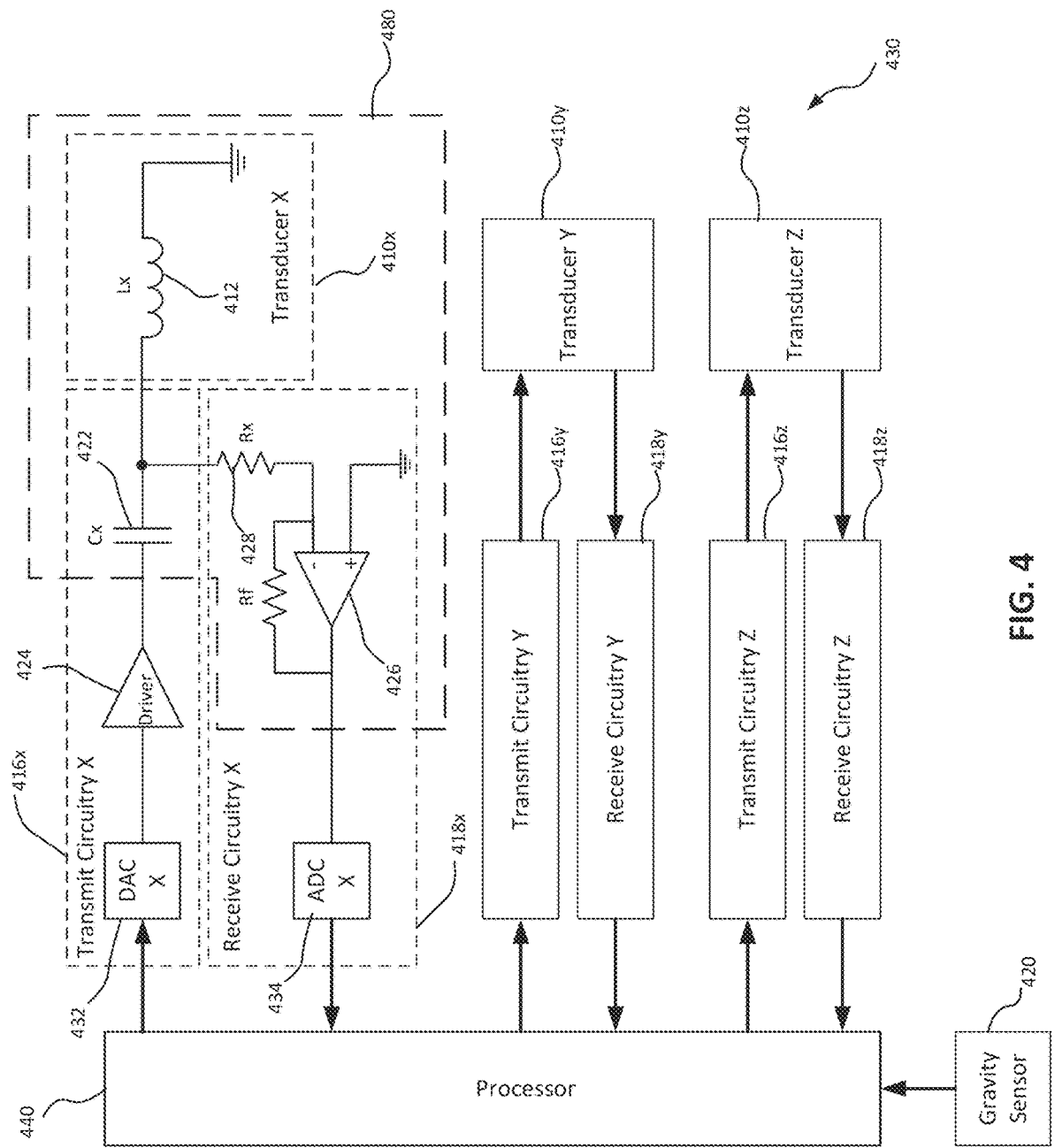
FIG. 4 is a schematic diagram illustrating an embodiment of transmit and receive circuitry within a magnetic induction transceiver capable of providing a net magnetic vector field having a net magnetic moment direction aligned with a sensed direction of gravity.

Referring to FIG. 4, an embodiment of circuitry used in a magnetic induction transceiver 430 is described in greater detail. As shown, the magnetic induction transceiver 430 includes transducers 410x, y, z corresponding to each of the local X, Y, Z axes and includes transmit circuitry 416x, y, z and receive circuitry 418x, y, z coupled to each of the transducers 410x, y, z. In this embodiment, a processor 440 is coupled to the transmit circuitry 416x, y, z and the receive circuitry 418x, y, z and to a gravity sensor 420 for sensing a direction of gravity.

In one example, each of the transducers 410x, y, z includes at least one wire coil (i.e., inductor 412) wound around a magnetically permeable material, such as a ferrite rod or core. The transducers 410x, y, z convert an electric current and/or voltage into a magnetic field for the generating/transmitting function and convert a magnetic field (i.e., generated by a transducer in another device) into an electric current and/or voltage for the detecting/receiving function. Although the same transducer is used for both generating/transmitting and detecting/receiving in the illustrated embodiment, other embodiments may use a generator or transmit transducer for generating magnetic fields and a separate detector or receive transducer for detecting magnetic fields (i.e., six transducers or coils). Although the transceiver 430 is shown with separate transmit and receive circuitry for each of the transducers 410x, y, z, some of the circuit components may be shared.

The processor 440 controls the transmit circuitry 416x, y, z to drive each of the respective transducers 410x, y, z to generate the respective X, Y, Z magnetic moments such that the net magnetic moment formed by superposition of the respective X, Y, Z magnetic moments has a net magnetic moment direction substantially aligned with the direction of gravity sensed by the gravity sensor 420. The processor 440 also controls the receive circuitry 418$x$, $y$, $z$ to combine responses from transducers 410$x$, $y$, $z$ to produce a detection response corresponding to the magnetic vector detected and to translate the detection response into a frame of reference that is substantially aligned with the direction of gravity sensed by the gravity sensor 420. Thus, when the transceiver 430 is within a magnetic field range of a similarly configured transceiver 430 in another device, the magnetic field generation and detecting functions of both transceivers will be commonly aligned to a common frame of reference.

In one embodiment, the detected magnetic field vector data when combined with knowledge of the magnitude and direction of the generated magnetic dipole moment, can be used to mathematically determine the distance between a generator device and a detector device. For devices with unconstrained relative physical orientations, this distance determination is possible because of knowledge of a common frame of reference for each device.

One example of the transmit circuitry 416$x$ includes a capacitor 422 and buffer amplifier or driver 424 coupled to the inductor 412 (e.g., the coil) of the transducer 410$x$. The driver 424 applies analog drive signals to the inductor 412 in conjunction with the capacitor 422 acting as a tuning element to optimize the current drive through the inductor 412. Inductor 412 may also be driven without being tuned. Depending upon the modulation scheme, a digital-to-analog converter (DAC) 432 may be used to convert the digital drive signals into analog signals for the coils. A single bit, direct digital drive may also be used. A DDS (Direct Digital Synthesizer) may also be incorporated especially for a frequency-shift keying or a phase-shift keying type modulation approach. The other transmit circuitry 416$y$, $z$ may be similarly configured.

One example of the receive circuitry 418$x$ includes an operational amplifier 426 coupled to the inductor 412 of the transducer 410$x$ with a resistor 428 for sensing the voltage at the junction of the capacitor 422 (Cx) and the inductor 412 (Lx), for setting the Q of the resonant circuit, and for protecting the op amp 426 during transmitting. In other embodiments, the op amp may be configured as a voltage amplifier and protected using other circuit components, and the detected signal may be read directly as the voltage at the junction of the capacitor 422 (Cx) and the inductor 412 (Lx). In such an embodiment, the Q of the circuit may be set by a series and/or parallel resistor with the inductor 412 (Lx) and/or the capacitor 422 (Cx). Those skilled in the art will recognize other circuit configurations capable of measuring the detected electrical signal from the inductor 412 (Lx) of the transducer 410. An analog-to-digital converter (ADC) 434 may convert analog signals from the operational amplifier 426 into digital signals for the processor 440. The other receive circuitry 418$x$, $y$ may be similarly configured, although the ADC 434 may be shared by the receive circuitry 418$x$, $y$, $z$ and multiplexed.

The digital processor 440 may perform much of the signal processing associated with the transmit and receive functions. The digital processor 440 may be implemented with a sequential microcontroller or a field programmable gate array, or some combination of these. The direction of gravity sensed by the gravity sensor 420 may be measured and processed digitally. The processor 440 may then compute a weighting function or scale factor for each of the local X, Y and Z axes based on the sensed direction of gravity to adjust the transmitting/generating functions to align with the direction of gravity. For transmitting, a common, digitally processed or modulated signal may be converted to analog drive signals by the DAC 432 and driven on each of the transducers 410$x$, $y$, $z$ according to the computed weighting or scaling factors in order to create a net magnetic moment vector aligned with the sensed direction of gravity. For receiving, the ADC 434 digitizes analog signals received by the operational amplifier 426 from the coil or inductor 412 and the processor 440 may filter, process, and demodulate the digitized analog signals to extract digital information. The processor 440 may also scale the received signals with scaling factors determined based on alignment with the sensed direction of gravity. Thus, the detected magnetic field vector is translated by the digital processor into a common frame of reference with the generated magnetic dipole.

In addition to or instead of communicating data between devices, a range and/or location of the generator may be computed in the processor from the received signals. Estimates of range and/or location may be based upon overall signal strength as well as on the strength of each individual signal received on the transducers (i.e., the direction of the received magnetic vector field with respect to the detector transducer's frame of reference). Thus, communication of information between device may include communicating data by modulating the magnetic field or communicating range and/or location information using the inherent properties of the detected magnetic field.

Signal strength may be transmitted from a transmitting device and/or estimated by a receiving device. The transmitted signal strength, received signal strength, or both may be used to estimate a transmission distance or location of a transmitting device relative to a receiving device. It may be advantageous to vary the transmit signal strength from time-to-time. When this is done, the actual transmitted signal level can be included in the data transmitted. In this way, the receiver can measure the received field and combine this information with knowledge of the actual generated field to better estimate distance between devices. In one embodiment, the transmit device alternates its generated magnetic dipole moment strength between two values so that every other transmit packet is at a different strength.

Modern processors, DAC, ADCs, DDSs, amplifiers, and related component ICs support practical operation in the frequency range typically used for magnetic coupling (<15 MHz). One skilled in the art could use other methods to implement these functions. For example, the scale factors could be applied in the analog processing domain by use of variable gain amplifiers in the drive and/or receive signal paths. The gains may still be determined in the processor since modern variable gain amplifiers can be configured digitally.

As mentioned above, the illustrated embodiment includes a single set of transducers (e.g., coils), thus sharing these transducers for transmit and receive. In other embodiments, however, a device may have a separate set of transducers for each of the generate/transmit and detect/receive functions (e.g., six transducers per device in some embodiments). A single set of transducers is advantageous to minimize the cost and volume. In addition, with a single set of transducers, the receiver can measure the phase of the transmit signal, which may also be advantageous because, with separately tuned or resonated transducers, their actual resonant response will likely vary.

Even without tuning, the individual transducers may vary in their phase response (i.e., the phase of the transducer current relative to the driven or received transducer voltage). The processor could use the measured phase response of each transducer coil during the generate/transmit function and then compensate or normalize it digitally so that each magnetic field component from each individual coil is of the same, or at the desired, phase relationship. This phase adjustment could also be accomplished with a regular calibration function in which each transducer is driven and measured for its phase response. The measured phase response of each transducer may be stored in processor memory for use by the processor in adjusting the phase characteristic of each transducer. Even in the unrealistic situation where all transducers generated phases perfectly aligned (i.e., no issues of component tolerance or variance), the processor may still adjust the transmit phase of certain transducers by 180 degrees in order to have maximum ability to align the net magnetic moment to the Earth's gravitational field for any physical orientation of the device.

The transceiver 430 may also include a shield 480 around at least the transducers 410x, y, z and possibly around a portion of the circuitry such as the capacitor 422, the operational amplifier 426 and the resistor 428. Increasing the magnetic field strength to increase the range may present challenges due to the electric fields associated with drive voltages. Unwanted and/or additional electric fields can corrupt the $1/d^3$ dipole relationship between magnetic field intensity and distance. The shield 480 may be used to attenuate, outside of the shield volume, the corresponding quasistatic electric field associated with drive voltages both on and to the transducer components, with minimal impact on the generated magnetic field used for transmitting. The shield may also attenuate and prevent external interfering electric field components from being received on the magnetic field receiving transducers. In other words, the shield may be used to reduce the corresponding electric field components at both the transmit device and the receive device, and thus allow the system of devices to more closely operate on the magnetic field components only. This allows the system to more closely follow the known mathematical relationships (i.e., dipole field patterns), therefore allowing for improved estimates of distances and locations between devices.

One implementation of this shield may be a conductive enclosure where the thickness of the conductive shield material is a fraction of the skin depth of the conductive shield material. For example, the skin depth of copper is approximately 100 μm (micrometers) at 500 KHz. A shield enclosure made of copper that was <10 μm thick would significantly attenuate 500 KHz electric fields that penetrate the shield enclosure but would allow the magnetic fields to penetrate with minimal attenuation. An embodiment has a single shield enclosing a single set of transducer coils, whereby the single set of coils are used both for detection and for generation of magnetic fields.

Other methods to achieve this shielding effect may include the use of conductive coatings or the use of metal enclosures with hole patterns, gaps or cuts designed to similarly attenuate the electric field passing through the enclosure, while passing the magnetic field with minimal attenuation. Although the terms "shield" and "shielding" are used herein, this selective passing of magnetic signals with little attenuation while significantly attenuating electric field signals may also be referred to as filtering. Differential drive techniques may also be used to minimize the electric field strength outside the transducers. Use of a differential signal to drive signals into the transducer can cause the electric fields from the two individual drive sources to cancel each other out at distances that are large compared to the differential drive signal spacing.

Figure 5:
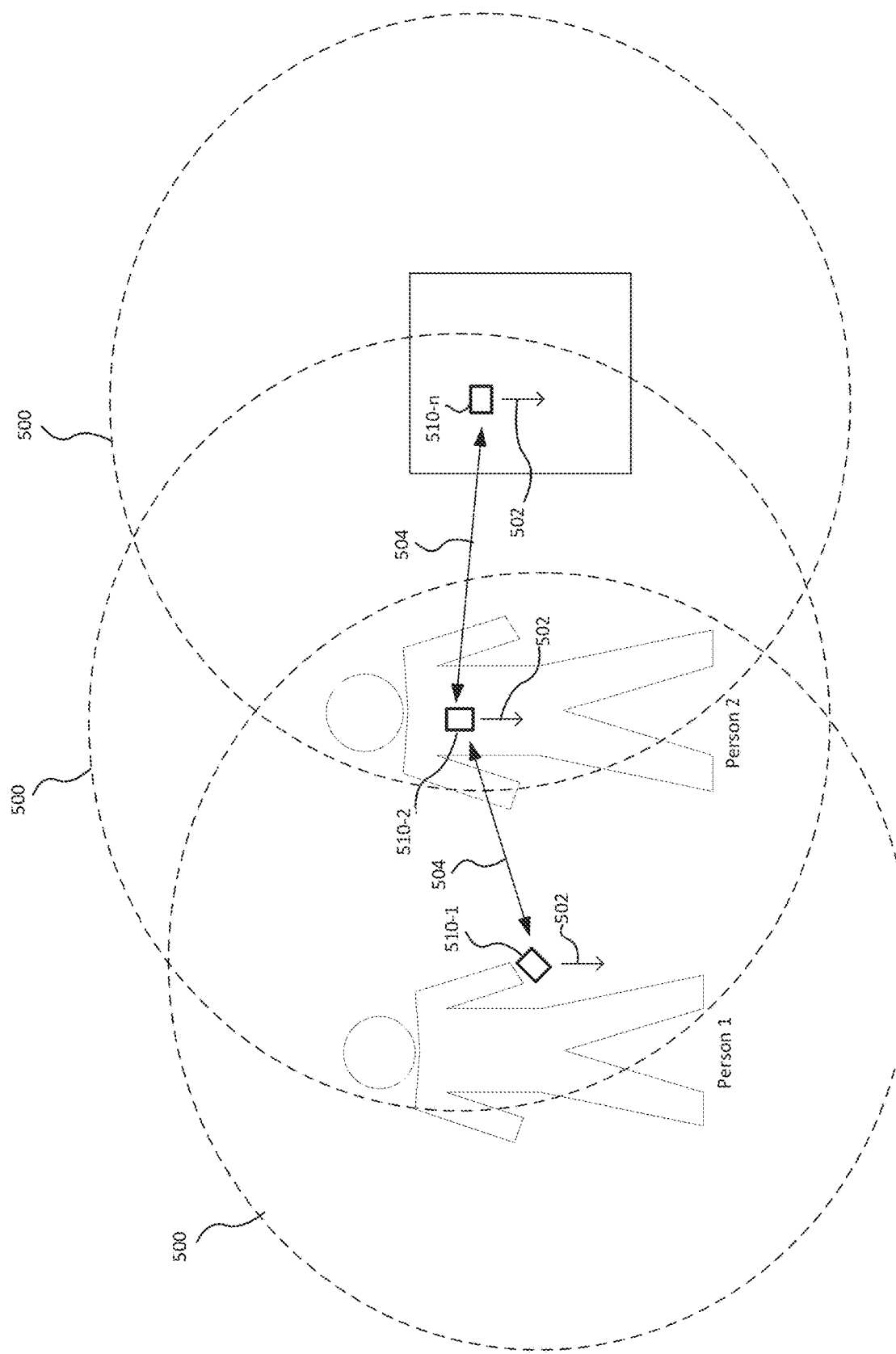
FIG. 5 is a schematic diagram of a system, consistent with embodiments of the present disclosure, including magnetic field coupling devices that are magnetically coupled with a net magnetic vector field having a net magnetic moment direction aligned with a direction of gravity.

Referring to FIG. 5, a system may include a plurality of magnetic communication devices 510-1, 510-2, 510-n to establish proximity magnetic communications 504 when located within a defined magnetic field range 500. Each of the magnetic communication devices 510-1, 510-2, 510-n substantially aligns the net magnetic moment 502 with a sensed direction of gravity, as described above, to improve magnetic coupling independent of the orientation of the magnetic communication devices 510-1, 510-2, 510-n. The magnetic communication devices 510-1, 510-2, 510-n may be worn by, carried by or otherwise affixed to individuals being tracked (Person 1, Person 2, . . . ) within a monitored area to track proximity of the individuals with respect to each other. Magnetic communication devices may also include static proximity devices (e.g., device 510-n) located at fixed locations within the monitored area such as an entrance to the area and/or a touch point to track proximity of the individuals with respect to those locations.

Each of the magnetic communication devices 510-1, 510-2, 510-n is configured to perform the proximity magnetic communications 504 with any of the other devices when located within the communication range 500, i.e., during a proximity contact interaction. As used herein, "proximity contact interaction" refers to an interaction between devices and/or individuals wearing such devices within a defined proximity range and does not require physical contact. One application for the magnetic communication devices 510-1, 510-2, 510-n may be as proximity sensing devices configured to record proximity contact interactions for contact tracing to mitigate the transmission of infectious disease.

In embodiments, each of the magnetic communication devices 510-1, 510-2, 510-n has an associated device identifier and is configured to transmit and receive these device identifiers using the proximity magnetic communication 504 with another sensing device. The magnetic communication devices 510-1, 510-2, 510-n are also configured to store proximity contact data associated with the proximity contact interaction including at least the received device identifiers. The proximity contact data may also include other data characterizing the proximity contact interaction including, without limitation, a time stamp associated with a particular proximity magnetic communication 504, a time period for or duration of a particular proximity magnetic communication 504, and a transmit and/or received signal strength of a particular proximity magnetic communication 504. The signal strength may be used to estimate a distance to another communication device. The data may also be used to estimate proximal location in addition to line of sight distance. This information may be derived using the knowledge that all devices are generating magnetic moments aligned on the same axis.

The magnetic communication devices 510-1, 510-2, 510-n may be configured as a wearable device, such as a badge, that is worn or carried by the individual. In the application of mitigating transmission of infectious disease, the wearable magnetic communication devices 510-1, 510-2, 510-n may have a defined magnetic field range 500 that corresponds to a transmission range of the infectious disease, for example, at least 6 feet and possibly up to 12 feet. In other applications, the devices may have a defined magnetic communication range 500 over 12 feet.

The magnetic communication devices 510-1, 510-2, 510-n may be periodically connected to another system (not shown), such as a contact tracing system, using one or more communication links to transfer data, such as proximity data logged by the devices 510-1, 510-2, 510-n. The other system may be implemented on one or more computer systems located at the area being monitored and/or at remote locations (e.g., in the cloud). The communication link(s) may include any wired or wireless communication link including, without limitation, WiFi, Bluetooth, magnetic communication, Ethernet, CAN, and USB. The communication link(s) may be direct or indirect via another device, such as a mobile phone or computer used by the individual. Static magnetic communication devices may have a hard-wired connection for establishing the communication link and for powering the static devices. In one example, power over ethernet may be used.

Figure 6:
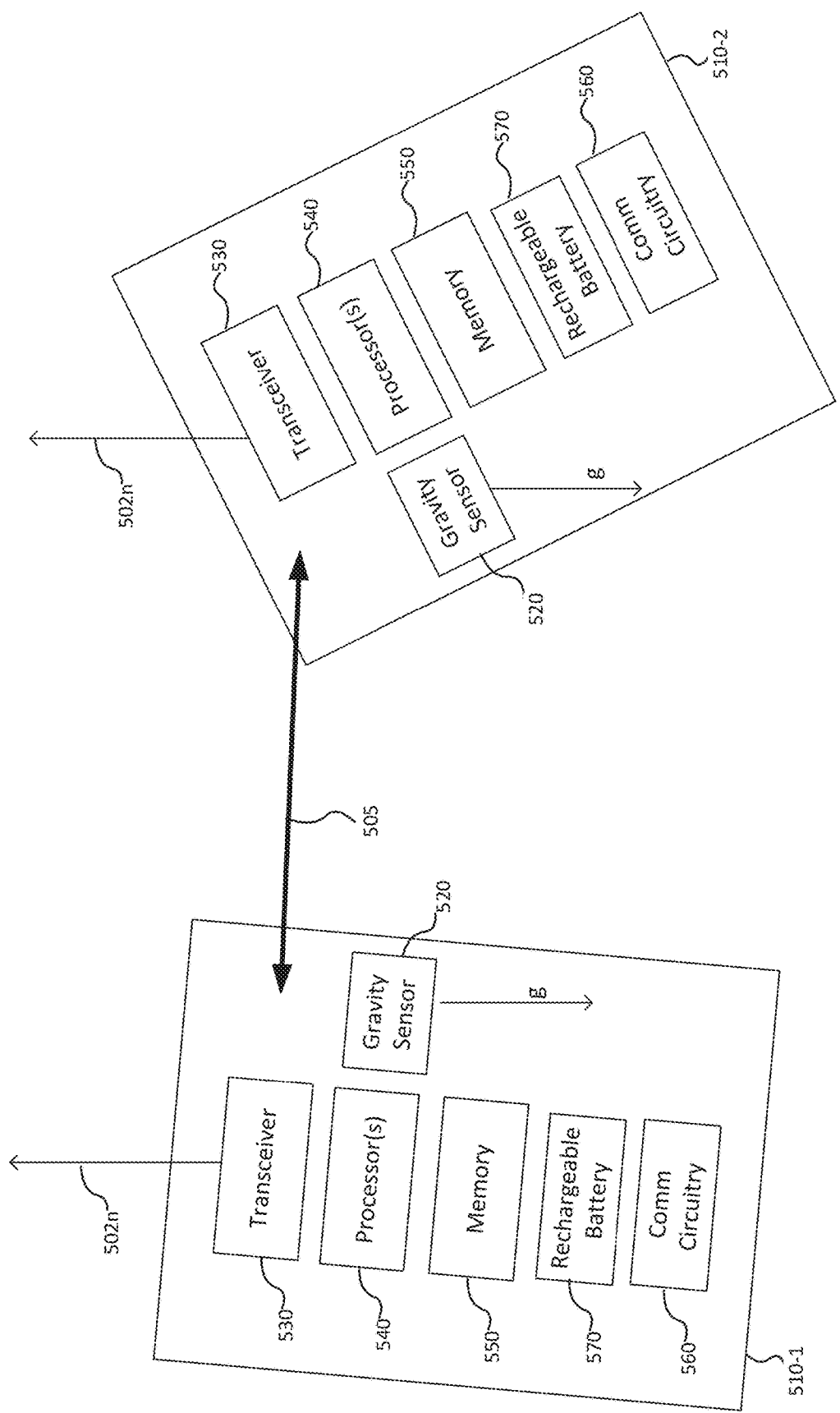
FIG. 6 is a schematic diagram of magnetic transceiver devices magnetically coupling with each other using a net magnetic vector field having a net magnetic moment direction aligned with a sensed direction of gravity, consistent with embodiments of the present disclosure.

Referring to FIG. 6, an embodiment of the magnetic communication devices 510-1, 510-2, particularly for proximity sensing, is described in greater detail. In this embodiment, each magnetic communication device 510-1, 510-2 includes a gravity sensor 520, a magnetic induction transceiver 530, one or more processors 540, a memory 550, communication circuitry 560, and a rechargeable battery 570. The magnetic induction transceiver 530 is configured to establish a magnetic coupling, which may transmit and receive data using modulation of magnetic fields to establish a proximity magnetic communication 504. The one or more processors 540 may include any known microprocessors for processing data and are configured to process the data transmitted and received by the transceiver 530. The memory 550 may include any known memory for storing data and is configured to store transmitted and received data. The processor(s) 540 may also be configured to control the magnetic induction transceiver 530 for adjusting the transmit and receive functions to align the net magnetic moment 502n substantially with the direction of gravity sensed by the gravity sensor 520, as described above.

The communication circuitry 560 may include any known circuitry for implementing a wired or wireless communication with another computing device or system and is configured to communicate with an external system (e.g., a contact tracing system or other database and/or network) via a wired or wireless communication link. The communication circuitry 560 may also be configured to communicate with communication circuitry in other devices 510. Examples of the communication circuitry 560 include, without limitation, WiFi circuitry, USB circuitry, Ethernet circuitry, CAN circuitry, and Bluetooth circuitry.

In some embodiments, the communication circuitry 560 may be used to communicate information between magnetic communication devices 510-n in addition to or instead of communicating information using the magnetic coupling. For example, a generating/transmitting device may communicate generated magnetic field strength information and/or orientation information indicating orientation relative to the common frame of reference to a detecting/receiving device. The detecting/receiving device may then produce a detection response from a detected magnetic field and use the transmitted magnetic field strength information and/or the orientation information to translate the detection response into the common frame of reference. Such communication may be used to assist in coordinating the generation and detection of magnetic fields by, for example, time-multiplexing the generate period for separate magnetically coupled devices so that only one device at a time generates a magnetic field. Any other system level parameters, settings, and commands that may optimize or facilitate the measurement of distance between magnetic communication devices 510-n may be communicated using the communication circuitry 560. The rechargeable battery 570 may include known rechargeable batteries capable of providing sufficient power to provide the magnetic coupling.

The magnetic induction transceiver 530 may include orthogonally-arranged transducers as described above. Each transducer generates a quasistatic magnetic field in the near field such that electromagnetic radiation may be minimized. The use of a quasistatic magnetic field is advantageous for proximity detection applications because such fields have minimal interaction with non-metallic surroundings, such as the human body, and also because the field strength drops off rapidly with distance and is less likely to interact with other devices that are not within the proximity range, thereby providing a more reliable proximity detection particularly in a densely packed area. Quasistatic magnetic fields also do not reflect like radio waves and thus do not generate echoes and multipath phenomena that might increase false positive proximity detections.

The defined magnetic field range of the magnetic induction transceiver 530 may be configured, for example, as a function of the size of the wire coil and/or current supplied to the wire coil. For an application involving contact tracing to mitigate transmission of an infectious disease, the magnetic induction transceiver 530 may be configured or controlled to provide a defined magnetic field range that corresponds to the transmission range of the infectious disease. In some embodiments, the magnetic induction transceiver 530 may be configured to produce a quasistatic magnetic field with a defined magnetic field range of at least about 6 feet and more specifically within a range up to 9 feet or up to 12 feet. The power loss in the resistive components of a magnetic transducer and its associated electrical drive circuitry can present challenges when increasing the magnetic field strength to extend the range. Because the proximity magnetic communication has a relatively low bandwidth requirement (e.g., as compared to transmission of audio data), the power required for at least a 6 feet range may be achieved with currently available rechargeable batteries. Transmitting with non-continuous, high intensity signals may be possible given the low bandwidth requirement. In one example, a data packet is transmitted using high intensity magnetic signals during a 10 millisecond duration at a repetition rate of one data packet per second.

The transceiver 530 also includes transmit circuitry and receive circuitry connected to the transducers, for example, as described above. The magnetic induction transceiver 530 may communicate with other such transceivers through amplitude modulation of the magnetic fields, although other modulation methods may also be used such as frequency or phase modulation. The transmit circuitry may be configured to drive the transducer with a modulated electrical signal for generating a modulated magnetic field. The transmit circuitry may include a digital-to-analog converter (DAC) function for converting encoded digital signals (e.g., data packets with device identifiers) into analog signals for transmission via the transducers. Additionally or alternatively, the communication circuitry 560 may be used to provide the communication between devices.

The receive circuitry is configured to receive a modulated electrical signal detected by the transducers when located within a modulated magnetic field generated by another transducer. The receive circuitry may include an analog-to-digital converter (ADC) for converting received analog signals (e.g., including data packets with device identifiers) into digital signals. The ADC may take the form of a comparator for the conversion of a modulated analog signal to a single-bit digital stream of information.

The processor(s) 540 (e.g., a microprocessor) may then digitally process, demodulate, and/or operate on the ADC data outputs to generate the received data, process the received data, and log the processed data. The logged data for each proximity contact interaction may also be time-stamped. In this embodiment, the processor(s) 540 may include transmit signal digital processing circuitry for processing the transmitted digital signal provided to the transmit circuitry and receive signal digital processing circuitry for processing the received digital signals from the receive circuitry. The receive signal digital processing circuitry may also decode the data packets that are received to extract the device identifiers, the transmit signal strength, and any other information encoded. The receive signal digital processing circuitry may also be configured to estimate the magnetic field strength of the transmitting device, which may then be used to estimate the distance between the devices (e.g., devices **510-1, 510-2, 510-*n* shown in FIG. 5**).

Although bi-directional communication is not required, a two-way communication capability may be used to provide additional functionality and/or reliability. For example, if the signal received is strong, the receiver may request a transmission packet at reduced transmit strength to help confirm a distance measurement by having the additional received signal strength data point after a known reduction in transmit signal strength. The ability for limited two-way communication may also be useful in mitigating channel collisions. Two-way communication may be achieved, for example, using time multiplexing, different frequencies, and/or different transmitting and receiving transducers. Time multiplexing or duty cycling may also be used so that only one device in a local plurality of devices was generating at a time.

In other embodiments, the magnetic communication devices 510 may also include supplementary proximity sensing technology to enhance the proximity detection function. The supplementary proximity sensing technology may include, without limitation, acoustic signals (e.g., high frequency ultrasound), optical signals, and Bluetooth signals. The proximity sensing device 510 may be implemented, for example, in a mobile phone that includes Bluetooth such that the magnetic communication technology is used together with Bluetooth for proximity contact detections. Alternatively, a wearable proximity sensing device 510 may include Bluetooth such that the magnetic coupling technology is used together with Bluetooth for proximity contact detections.

The devices, systems and methods described herein are particularly suited for narrower applications (as opposed to widespread contact tracing) where numerous people interact within an area and may be in close proximity. Such narrower applications include business and other large organizations that employ or host people in a facility or venue including, without limitation, factories, warehouses, distribution centers, restaurants, entertainment venues, sports arenas or venues, theatres, retail stores, malls, school campuses and facilities, government facilities, hospitals, and the like. In these applications, the devices, systems and methods described herein can improve the safety of the employees and/or visitors by recording and tracing their proximal contact with others within the facility or venue.

In these applications, the proximity sensing devices are wearable by the individuals (e.g., the employees or patrons) to determine proximity to other sensing devices and log data associated with these proximity contact interactions. The logged data may then be stored in the contact tracing system to track the number and duration of interactions between occupants throughout the facility or venue. When an individual is determined to be at risk for an infectious disease (e.g., a symptom, exposure, diagnosis or a positive test result), the contact data may be used (e.g., by the employer or operator of the facility or venue) to take actions (e.g., isolation and/or quarantine, further testing, notification, etc.) to protect those (e.g., other employees, visitors, vendors, patrons, students, etc.) who have been in contact with the at risk individual. Such a system may be particularly beneficial to an employer to protect its overall workforce from further transmission, thereby minimizing the impact to its operations.

Although a particular application of contact tracing to prevent transmission of an infectious disease is described herein, the devices, systems and methods described herein may also be used in other applications where there is a need for tracking proximity of individuals or objects. For example, the proximity sensing devices may be used with robots where many robots are operated simultaneously, such as a shipping and distribution center, to provide local collision avoidance and traffic management. In such an application, the proximity sensing devices may be used with both the robots and with individuals to provide the robots with a proximity detection system for human workers in the same space and improve safety.

In another example, proximity sensing devices may be used with unmanned aerial vehicles (UAVs) to provide local collision avoidance and coordination of flight between swarms of UAVs and/or to aid in formation flying for such systems. In these applications, full duplex communication may be used to improve control bandwidth options. Other applications are also possible and contemplated, although not explicitly described herein.

As used in any embodiment herein, "circuit" and "circuitry" may include, for example, singly or in any combination, analog circuitry, digital circuitry, hardwired circuitry, programmable circuitry such as a microcontroller, programmable logic (CPLD, FPGA, etc.), state machine circuitry, and/or firmware that stores instructions executed by programmable circuitry. "Integrated circuit", as used in any embodiment herein, may include a circuit or circuitry in the form of a semiconductor device and/or microelectronic device, such as, for example, a semiconductor integrated circuit chip or application specific integrated circuit (ASIC). The transmit and receive circuitry and digital processing circuitry may be implemented as any circuit or circuitry, including an integrated circuit, configured to perform the functions described herein. Those skilled in the art will recognize various implementations for the circuitry including any combination of hardware, software and firmware that is configured or programmed to perform the functions described herein. Although the illustrated embodiments show discrete blocks representing circuitry that performs various functions, the circuitry is not necessarily located in a discrete unit and the arrangement of the circuitry is not intended to be a limitation of the present disclosure.

As will be appreciated by one skilled in the art, embodiments of the present disclosure may include methods, systems, or computer program products. Accordingly, embodiments of the present invention may take the form of hardware, software, firmware, or any combination thereof, which may generally be referred to herein as a "circuit," "module" or "system." Furthermore, embodiments of the present disclosure may take the form of a computer program product on a tangible, non-transient computer-usable storage medium having computer-usable program code embodied in the medium.

Any suitable computer usable or computer readable medium in the form of an article of manufacture may be utilized. The computer readable medium may be, for example but not limited to, an electronic, magnetic, optical, electromagnetic, infrared, or semiconductor system, apparatus, device, or tangible propagation medium. More specific examples (a non-exhaustive list) of the computer-readable medium would include the following: an electrical connection having at least one wire, a portable computer diskette, a hard disk, a random access memory (RAM), a read-only memory (ROM), an erasable programmable read-only memory (EPROM) or Flash Memory, an optical fiber, a portable compact disc read-only memory (CD-ROM), an optical storage device, a transmission media such as those supporting the Internet or an intranet, or a magnetic storage device. Examples of computer executable instructions may include any suitable type of code, such as source code, compiled code, interpreted code, executable code, static code, dynamic code, object-oriented code, visual code, and the like.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A device comprising:
   a plurality of transducers configured to generate quasistatic magnetic fields to establish a magnetic coupling with at least one coupled transducer of a separate device when located within a magnetic field range, wherein each of the plurality of transducers are configured to generate the magnetic fields, respectively, having different magnetic dipole moments with vector components in at least two axes, wherein superposition of the magnetic fields forms a net magnetic moment, wherein each of the plurality of transducers is configured to detect magnetic fields generated by the at least one coupled transducer of the separate device within the magnetic field range to produce detected signals;
   a sensor physically coupled with a known alignment relative to the plurality of transducers, the sensor configured to sense a fixed direction in a common frame of reference; and
   circuitry configured to determine scaling factors for the at least two axes, respectively, based on a physical orientation of each of the plurality of transducers relative to the fixed direction and configured to drive the plurality of transducers with drive signals scaled according to the scaling factors to control at least magnitudes of each of the magnetic fields such that the net magnetic moment aligns with the fixed direction in the common frame of reference, wherein the circuitry comprises:
      a processor coupled to the sensor, wherein the processor is configured to determine the fixed direction based on an output from the sensor and configured to compute the scaling factors based on the physical orientation of each of the plurality of transducers relative to the fixed direction;
      transmit circuitry coupled to the processor and the plurality of transducers, wherein the processor is configured to control the transmit circuitry to scale the drive signals to drive the plurality of transducers according to the scaling factors; and
      receive circuitry coupled to the processor and the plurality of transducers, wherein the processor is configured to control the receive circuitry to scale the detected signals according to the scaling factors.

2. The device of claim 1 wherein the sensor includes a gravity sensor configured to sense a direction of gravity as the fixed direction in the common frame of reference.

3. The device of claim 1 wherein the plurality of transducers include at least three transducers configured to generate three magnetic dipole moments with vector components in three axes.

4. The device of claim 1 wherein each of the plurality of transducers comprises a coil.

5. The device of claim 1 further comprising a shield around at least the plurality of transducers to attenuate any corresponding quasistatic electric field with minimal impact on the magnetic field.

6. The device of claim 1 wherein the processor is configured to process a transmit digital signal to communicate transmitted data to the separate device using the magnetic coupling.

7. The device of claim 1 further comprising communication circuitry configured to establish communication without using the magnetic coupling.

8. A method comprising:
   sensing a fixed direction in a common frame of reference relative to at least one transmitting device, the transmitting device including at least two transmitting transducers aligned respectively with at least two axes in the transmitting device;
   determining scaling factors for the at least two axes of the transmitting transducers based on a physical orientation of each of the at least two transmitting transducers in the transmitting device relative to the fixed direction;
   driving the at least two transmitting transducers with drive signals scaled according to the scaling factors determined for the at least two axes of the transmitting transducers, wherein the at least two transmitting transducers generate at least one quasistatic magnetic field in the transmitting device, the quasistatic magnetic field having a net magnetic moment aligned with the fixed direction in the common frame of reference;
   sensing the fixed direction in the common frame of reference relative to at least one receiving device, the receiving device including at least two receiving transducers aligned respectively with at least two axes in the receiving device;
   determining scaling factors for the at least two axes of the receiving transducers based on a physical orientation of each of the at least two receiving transducers in the receiving device relative to the fixed direction;
   detecting by the at least two receiving transducers in the receiving device the at least one quasistatic magnetic field generated in the transmitting device; and
   scaling detected signals detected by the at least two receiving transducers according to the scaling factors determined for the at least two axes of the receiving transducers, wherein the transmitting device and the receiving device are magnetically coupled.

9. The method of claim 8 wherein the at least one quasistatic magnetic field includes a plurality of magnetic fields having different magnetic dipole moments with vector components having different orientations in the transmitting device such that superposition of the magnetic fields forms a net magnetic vector field with the net magnetic moment aligned with the fixed direction in the common frame of reference.

10. The method of claim 8 further comprising transmitting generated magnetic field strength information from the transmitting device to the receiving device.

11. The method of claim 8 further comprising performing a distance measurement in the receiving device to estimate a distance between the transmitting device and the receiving device.

12. The method of claim 11 wherein the transmitting device has a defined magnetic field range, and wherein the distance measurement is performed based on magnetic coupling within the defined magnetic field range.

13. The method of the claim 11 wherein the distance measurement is performed based on a detected magnetic field strength and/or direction.

14. The method of claim 8 further comprising communicating transmitted data from the transmitting device to the receiving device using the quasistatic magnetic field generated in the transmitting device.

15. The method of claim 8 wherein the transmitting device and the receiving device are transceiver devices configured to generate and detect quasistatic magnetic fields.

16. The method of claim 8 wherein sensing the fixed direction in the common frame of reference includes sensing a direction of gravity.

17. A system comprising:
a plurality of magnetic transceiver devices configured to perform a proximity magnetic coupling when located within a magnetic field range, wherein each of the magnetic transceiver devices comprises:
a plurality of transducers configured to generate a plurality of transmitted quasistatic magnetic fields and to detect received quasistatic magnetic fields generated by a separate one of the magnetic transceiver devices to establish the magnetic coupling when located within the magnetic field range, wherein the transducers are configured to generate the transmitted quasistatic magnetic fields, respectively, having different magnetic dipole moments with vector components in at least two axes, wherein superposition of the transmitted quasistatic magnetic fields forms a net magnetic vector field with a net magnetic moment;
a sensor physically coupled with a known alignment relative to the plurality of transducers, the sensor configured to sense a fixed direction in a common frame of reference;
transmit circuitry coupled to each of the plurality of transducers, wherein the transmit circuitry is configured to drive the plurality of transducers with drive signals to generate the plurality of transmitted quasistatic magnetic fields;
receive circuitry coupled to each of the plurality of transducers, wherein the receive circuitry is configured to receive detected signals from the plurality of transducers detecting the received quasistatic magnetic fields; and
a processor coupled to the sensor, the transmit circuitry and the received circuitry, wherein the processor is configured to determine the fixed direction relative to the transducers based on the output from the sensor and to compute scaling factors for the at least two axes, respectively, based on a physical orientation of each of the plurality of transducers relative to the fixed direction, wherein the processor is configured to control the transmit circuitry to scale the drive signals according to the scaling factors, respectively, and drive the plurality of transducers such that the net magnetic moment aligns with the fixed direction, and wherein the processor is configured to control the receive circuitry to scale the detected signals according to the scaling factors, respectively, and produce a detection response translated into the common frame of reference.

18. The system of claim 17 further comprising communication circuitry configured to establish wireless communication between the magnetic transceiver devices.

19. The system of claim 17 wherein the sensor includes a gravity sensor to sense a direction of gravity as the fixed direction.

20. The system of claim 17 further comprising a shield around at least the transducers to attenuate any corresponding quasistatic electric field with minimal impact on the magnetic field.

21. The system of claim 17 wherein the transducers are configured to generate the quasistatic magnetic fields with a defined magnetic field range of at least 6 feet.

22. The system of claim 17 wherein the magnetic transceiver devices are proximity sensing devices configured to be worn or carried.

23. The system of claim 17 wherein the processor is configured to process received data and transmitted data, wherein the received data is demodulated from the received quasistatic magnetic fields, and the transmitted data is modulated on the transmitted quasistatic magnetic fields, and further comprising a memory configured to store the transmitted data and the received data.

24. The system of claim 23 wherein the transmitted data and the received data includes device identifiers.

25. The system of claim 24 wherein the transmitted data and the received data includes at least one of a duration and a signal strength for the proximity magnetic communication.

26. The system of claim 17 wherein the plurality of transducers include at least three transducers in X, Y and Z axes configured to generate the transmitted quasistatic magnetic fields.

* * * * *